Aug. 22, 1944.    W. E. BENJAMIN    2,356,202
GOVERNOR SPRING STRUCTURE
Filed June 25, 1942
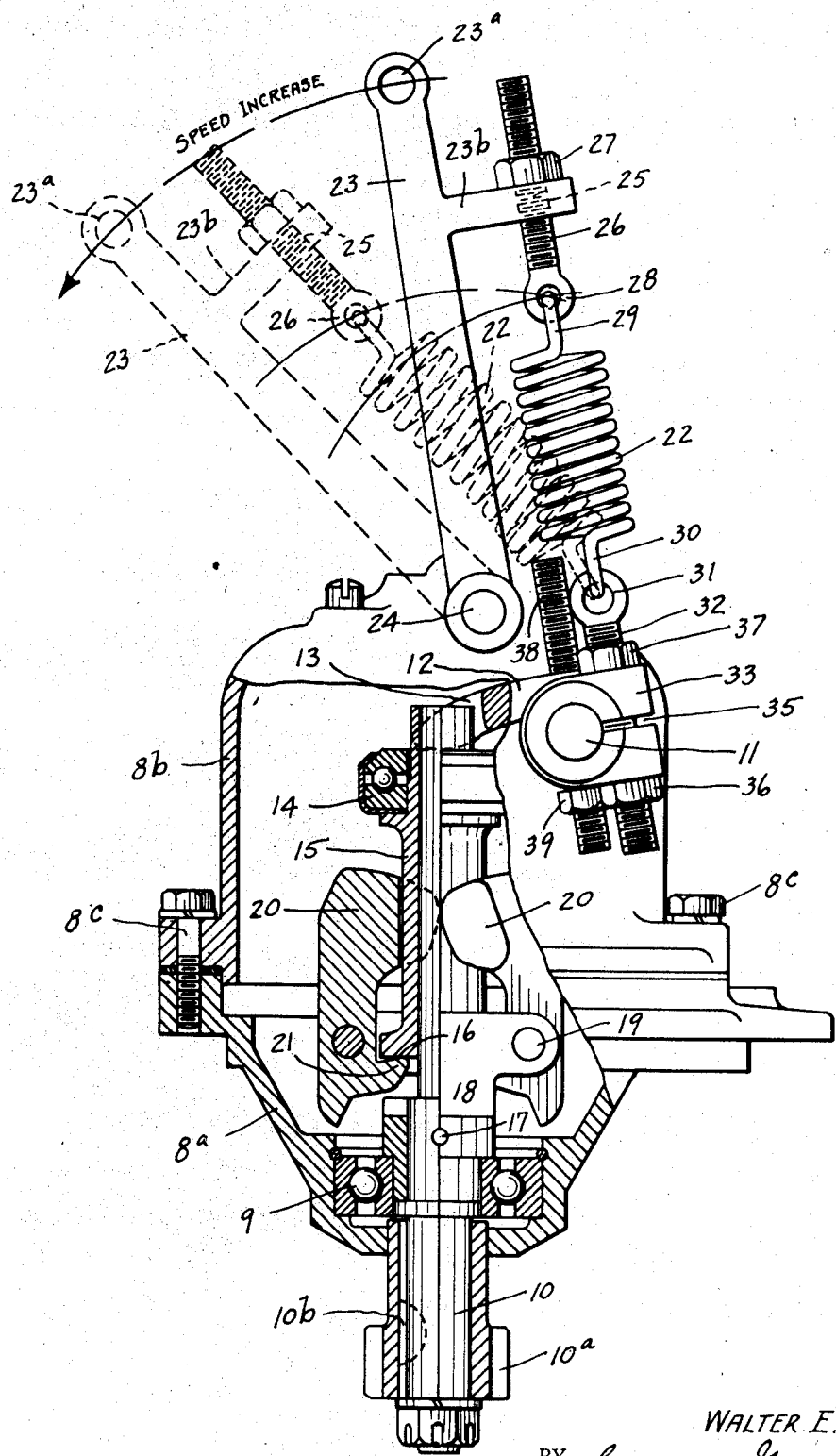
INVENTOR.
WALTER E. BENJAMIN.
BY Lockwood, Goldsmith & Galt,
ATTORNEYS.

Patented Aug. 22, 1944

2,356,202

UNITED STATES PATENT OFFICE 2,356,202

GOVERNOR SPRING STRUCTURE

Walter E. Benjamin, Anderson, Ind., assignor to Pierce Governor Company, Anderson, Ind.

Application June 25, 1942, Serial No. 448,402

2 Claims. (Cl. 267—1)

This invention relates to a centrifugal governor for internal combustion engines and the like, but not necessarily restricted thereto.

The chief object of this invention is to appropriately modify or adjust a centrifugal governor structure so the usual hunting or surging at top or high regulating speeds is substantially eliminated.

Heretofore this condition has been eliminated by the employment of a plurality of load springs which successively become effective or one of which is effective for a portion of the regulating range and another of which is effective over a portion of the first portion and effective over a portion of the range thereafter, or which is so arranged that one spring is effective over the entire range and one or more springs in succession superimpose their effects thereon, or vice versa.

It has been discovered, and this is the chief feature of this invention, that the multiple effects of multiple springs can be obtained with a single conventional load spring by modifying its direction and force so that in a centrifugal governor utilized for multiple speed regulation of a single power unit, the governor when adjusted is of such character that hunting or surging at high speeds does not occur and this modification is obtained by the addition of an adjustable stop or abutment for the singular load spring.

To fully appreciate the scope of this invention, the following summarizes the present situation. Centrifugal governors have been utilized in industrial installations, such as generator sets, compressors, loading equipment and the like where it is usual for the operator to select an efficient and safe engine or prime mover speed and set the governor accordingly.

The present defense and war situation has brought about many changes and many new uses for power equipment which incidentally has required that the governor provide for a diversified speed setting. For example, in mobile equipment moving speed may be greater than working speed. In one example, working speeds require engine operation at 1,200 and 1,400 R. P. M. while moving speed required engine operation at 2,000 R. P. M. for efficient operation of the mobile equipment.

As previously described, multiple spring governor arrangements heretofore accomplished proper engine control. The present invention, a single spring of the proper size, et cetera, in combination with the required weights, provides a centrifugal governor control capable of properly functioning at different selected speeds for engine regulation and particularly regulation without hunting or surging at the higher selected speeds.

Other objects and features of the invention will be set forth more fully hereinafter.

The full nature of the invention will be understood from the accompanying drawing and the following description and claims.

In the drawing, the single figure is a side elevation of a governor with portions of the housing removed to show the invention in greater detail, the full lines indicating a low speed adjustment and the dotted lines a high speed adjustment, the unit control to the primary control shaft being omitted for clearness.

In the drawing, 10 indicates a shaft rotatable proportional to the speed of the prime mover, such as an internal combustion engine by means of a gear 10a keyed to shaft 10 as at 10b. A rock shaft 11 is the primary control shaft to which may be secured any desired mechanism for controlling the fuel or power supply to such engine or prime mover. Such control mechanism is of conventional character and accordingly, for simplicity and clearness, is omitted. This shaft mounts a bifurcated arm 12 having portions 13 straddling shaft 10 and engaged by an antifriction structure 14 associated with a sleeve 15 having bearing face 16.

Sleeve 15 may rotate with shaft 10 but must be freely slidable longitudinally thereof. Pinned as at 17 or otherwise suitably secured to shaft 10 is a weight base 18 having pivotal supports 19 for centrifugally operable weights 20. These weights have tails 21 adapted to engage face 16 and move sleeve 15 longitudinally of shaft 10 when the speed of shaft 10 is sufficient therefor. An antifriction support 9 may be interposed between base 18 or shaft 10 and housing 8a. Shaft 11 is operatively associated with a load spring 22. Housing 8a is connected to housing 8b at 8c. Shaft 11 projects from housing 8b.

Before describing the pertinent portions of this invention, reference will be had to the foregoing description, which so far describes a conventional centrifugal governor structure. In operation as sleeve 15 advances on shaft 10 with contact structure 14 and toward the bifurcated lever 12, the latter is rocked clockwise with shaft 11 in opposition to the force of extending or load spring 22. The greater the speed of shaft 10 the greater will be the centrifugal force available for opposing this spring force resulting in clockwise rocking of shaft 11 and corresponding movement of the engine and like control mechanism operatively associated with and operable by this primary shaft, which, as stated, is omitted for clearness.

As the speed of shaft 10 drops due to the control operation of shaft 11, et cetera, shaft 11 rotates counterclockwise until equilibrium is established between power control and engine speed.

For low engine speeds, continuous oscillation of shaft 11 to establish equilibrium is absent or negligible. For high speeds in a conventional governor, this oscillation is normally quite appreciable; hence, at high speeds governors of this type normally hunt or surge. All of the aforesaid, it is repeated, is old and well known in the centrifugal governor art.

With the present invention, this surging or hunting is eliminated. For example, a Buda motor under dynamometer test with the present invention was controlled as follows for different selected speeds.

800 R. P. M. at full load and 900 R. P. M. at no load
1,100 R. P. M. at full load and 1,200 R. P. M. at no load
1,500 R. P. M. at full load and 1,600 R. P. M. at no load
2,000 R. P. M. at full load and 2,100 R. P. M. at no load Since in each case or for each throttle setting, the difference in speed was 100 R. P. M. it is obvious that at the higher speeds this difference becomes less in percentage that is while 12½% at 800 R. P. M. it was only 5% at 2000 R. P. M.; hence, this governor with the included invention actually secures greater regulation in R. P. M. at top or high speeds which is substantially the reverse of similar standard governors as described and which do not include the invention.

Previous attempts to obtain similar or comparable results have been described hereinbefore. However, these attempts required the use of two or more springs with attendant calibration against standard springs and subsequent adjustment individually and collectively for the desired result. The present invention, therefore, constitutes a solution requiring no additional spring nor complicated compensating mechanism. The invention indeed is characterized by its outstanding simplicity and so far as known has never been utilized in a single spring centrifugal governor.

The invention includes the following: A throttle lever 23 is pivotally mounted on tub shaft 24 externally of the housing. The outer end of the shaft may be manually engaged for shifting said lever into any desired position determinable by the speed at which the engine is desired to operate. The free end has an eye 23a by which a remote control can be connected for suitably adjusting the position of lever 23 to maintain the desired engine speed.

Lever 23 includes a lateral projection 23b which is apertured at 25 and threaded. Therein is threaded eye bolt 26 the adjusted position of which is locked by nut 27. One end 29 of load spring 22 is secured to the eye 28, as shown. The other end 30 of said load spring is similarly secured to eye 31 of eye bolt 32 threaded into arm 33 rigid with primary control shaft 11. This arm is slit at 35 for conventional clamp mounting on the exposed end of the shaft 11 carrying the bifurcated member 12 rigid therewith. Locknut 36 secures the eye bolt in adjusted position. Clamp bolt 37 beside same secures arm 33 to the shaft 11. This arm is apertured parallel to the eye bolt mounting and therein is threaded adjustable stop 38 locked by nut 39. Note that this stop moves with arm 33 in the preferred form although in certain instances this adjustable stop or abutment might be carried by the housing 8b and juxtapositioned relative to spring 22 for similar control thereof as hereinafter described.

Inasmuch as throttle adjusting lever 23 is pivoted eccentric of primary shaft 11, therefore, when lever 23 is moved from the full line position toward the dotted line position, or from low speed governor setting to high speed governor setting, the spring 22 engages the stop 38 regardless of shaft 11 movement. Hence, the rate, force and direction of spring 22 is progressively modified toward the higher speed settings of throttle lever 23. Note that the spring 22 is arched or curved at high speed settings, see dotted line, and by reason of spring contact with stop 38 and extended by the then offset position of eye member 26, herein member 38 is an adjustable engageable abutment.

At any time one of the higher speed settings when spring 22 contacts stop 38, the force et cetera, of spring 22 is modified so that its opposing effect to the rocking of shaft 11 by the weights will be modified and accordingly, the power unit control mechanism moved by shaft 11, will be moved only in accordance with centrifugal force as opposed by the modified force of the spring 22.

This arrangement accordingly, utilizes a single spring to attain wide range control of a power unit and without hunting or surging at the higher speed settings.

While the invention has been illustrated and described in great detail in the drawings and foregoing description, the same is to be considered as illustrative and not restrictive in character.

The modification described herein as well as others which will readily suggest themselves to persons skilled in this art, all are considered to be within the broad scope of the invention, reference being had to the appended claims.

The invention claimed is:

1. A rate varying construction for a centrifugal governor manually adjustable, coiled load spring, comprising a tiltable anchorage for one end of the spring, a second tiltable anchorage for the other end of the spring, the tilting axes of the anchorages being offset from each other and remote from said other end of the spring, and abutment means including an axially adjustable member disposed between the axes and having a spring contacting portion disposed between the spring ends, said means being adjacent the said one end of the spring and contacting same between the ends thereof for varying the normal spring rate and direction of deflection of the spring, the tilted position of the second tiltable anchorage determining the corresponding line of action of said spring for such tilted position.

2. A rate varying construction as defined by claim 1 wherein the member is mounted in the first anchorage and is tiltable therewith.

WALTER E. BENJAMIN.